United States Patent [19]

Iida et al.

[11] 4,308,930
[45] Jan. 5, 1982

[54] MUFFLER FOR A VEHICLE

[75] Inventors: Akio Iida, Kawasaki; Kimio Miyake, Yokohama, both of Japan

[73] Assignee: Kabushiki Kaisha Komatsu Seisakusho, Tokyo, Japan

[21] Appl. No.: 87,704

[22] Filed: Oct. 24, 1979

[30] Foreign Application Priority Data

Nov. 2, 1978 [JP] Japan .............................. 53-150314

[51] Int. Cl.³ ........................ F01N 1/14; F01N 1/00
[52] U.S. Cl. ............................ 180/89.2; 181/255; 181/262
[58] Field of Search ............................. 181/247–255, 181/262–263; 123/41.7, 41.64, 195 C, 198 E; 180/54 A, 69 R, 89.2

[56] References Cited

U.S. PATENT DOCUMENTS

| | | | |
|---|---|---|---|
| 2,511,359 | 6/1950 | McLeod | 181/262 |
| 2,845,133 | 7/1958 | Norrie et al. | 181/69 R |
| 3,866,580 | 2/1975 | Whitehurst et al. | 123/41.7 |
| 4,086,976 | 5/1978 | Holm et al. | 180/54 A |

Primary Examiner—L. T. Hix
Assistant Examiner—Thomas H. Tarcza
Attorney, Agent, or Firm—Armstrong, Nikaido, Marmelstein & Kubovcik

[57] ABSTRACT

A muffler for a vehicle mounted on a hood of an engine compartment, comprising an outer cylindrical member having a plurality of openings formed in the lower side wall thereof, an inner cylindrical member mounted on the bottom wall of the outer cylindrical member, the inner cylindrical member being connected to an exhaust pipe and reduced in diameter at the upper side wall thereof, and an extension pipe connected to the upper end of the outer cylindrical member wherein the outer cylindrical member is mounted on the hood in such a manner that the approximately lower half thereof is positioned under the hood.

3 Claims, 2 Drawing Figures

4,308,930

MUFFLER FOR A VEHICLE

BACKGROUND OF THE INVENTION

This invention relates to a muffler for use in road vehicles. There are various methods of suppressing the level of noise generated by the engine etc. of vehicles; however, it is most effective to close the noise generating sources with covers. The engine and the fan forming main noise generating sources are enclosed by the engine compartment wall, however, the engine compartment is, in general, not covered up tight because it is required to radiate the heat generated by the engine per se. Lately, such noise has posed a social problem as a public hazard and it has become impossible to achieve the target of suppressing the noise by means of a conventional cover. Therefore, noise-proof or noise suppressing vehicles have such a structure as the engine compartment is covered up tight and the air within the engine compartment can be discharged through its muffler by means of an ejector.

SUMMARY OF THE INVENTION

It is therefore an object of the present invention to provide a muffler for a vehicle which is capable of suppressing the generation of noise therefrom.

Another object of the present invention is to provide a muffler for a vehicle in which the muffler is resiliently mounted on a hood of an engine compartment with little rocking or rolling motion in lateral directions.

A still further object of the present invention is to provide a muffler for a vehicle which is capable of providing a good field of vision for a driver.

In accordance with an aspect of the present invention, there is provided a muffler for a vehicle mounted on a hood of an engine compartment, comprising: an outer cylindrical member having a plurality of openings formed in the lower side wall thereof, said outer cylindrical member being formed in a conical shape at the upper side wall thereof and having a bottom wall in which a lower opening is formed; an inner cylindrical member mounted on the bottom wall of said outer cylindrical member, said inner cylindrical member being connected at the bottom thereof to an exhaust pipe and reduced in diameter at the upper side wall thereof; and mounting means for resiliently mounting said outer cylindrical member on said hood in such a manner that approximately lower half of said outer cylindrical member is positioned under said hood.

The above and other objects, features and advantages of the present invention will be readily apparent from the following description taken in conjunction with the accompanying drawings.

DETAILED DESCRIPTION OF THE INVENTION

The present invention will now be described with reference to the accompanying drawings.

Figure 1:
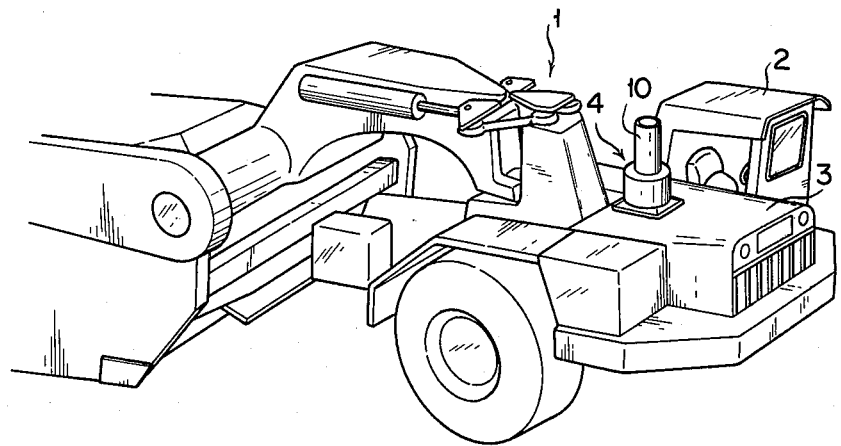
FIG. 1 is a partial prespective view of a scraper having a muffler of the present invention mounted thereon.
Figure 2:
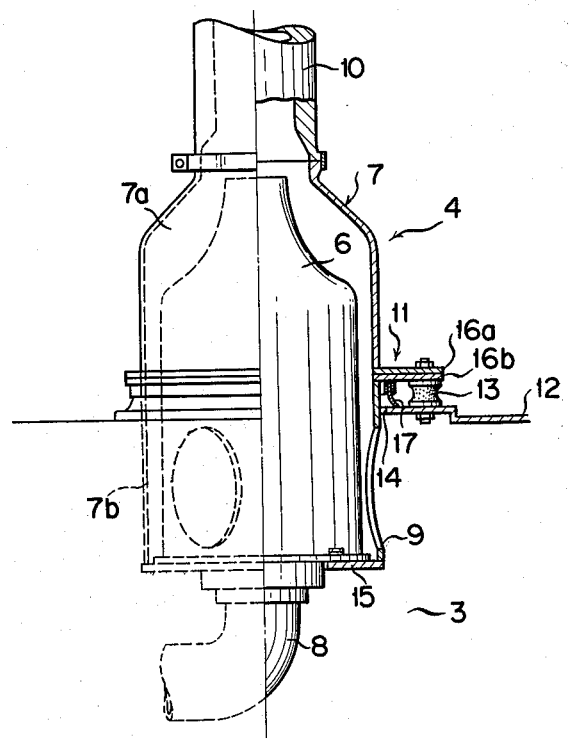
FIG. 2 is a front elevational view partly in cross-section of a muffler according to the present invention.

In FIG. 1, reference numeral 1 denotes a scraper showing an example of vehicle to which the present invention is applied, 2 a driver's cab, 3 a hermetically sealed engine compartment, and 4 a muffler. The above-mentioned muffler 4 comprises, as shown in FIG. 2, an inner cylinder 6 and an outer cylinder 7 surrounding the inner cylinder. The inner cylinder 6 is of the conventional muffler structure, and has a base portion connected to an exhaust pipe 8 extending from an engine (not shown) within the engine compartment 3 and a leading portion of a reduced diameter. The outer cylinder 7 is formed concentrically with the inner cylinder 6 so as to surround the latter and keep a clearance therebetween, and its base portion communicates through openings 9 with the interior of the engine compartment 3. Connected to the leading end of the outer cylinder 7 is an extension pipe 10 projecting upwardly above the leading end of the inner cylinder 6. Emission of exhaust gas through the leading end of the inner cylinder 6 will produce a low pressure region between the leading end of the inner cylinder 6 and that of the outer cylinder 7 or the base portion of the extension pipe 10 so as to provide an ejector effect.

The above-mentioned outer cylinder 7 comprises an upper outer cylinder 7a and a lower outer cylinder 7b. Flange portions 16a and 16b are formed at the joining portion of the upper and lower outer cylinders 7a and 7b, the flange portions 16a and 16b forming a mounting seat 11.

Attached to the lower surface of the mounting seat 11 is an isolating seal 17 surrounding the outer cylinder 7. The mounting seat 11 is secured through a mounting cushion 13 to an engine hood 12 attached to the upper surface of the engine compartment 3, and therefore the outer cylinder 7 is supported by the engine hood 12.

The lower part of the outer cylinder 7 is inserted through an aperture 14 into the engine compartment 3 and has the aforementioned communicating holes 9 formed therein.

The inner cylinder 6 is mounted on the support member 15 which is fixedly secured to the lower end of the outer cylinder 7.

Thus, the exhaust gas from the exhaust pipe 8 passes through the inner cylinder 6 and is discharged to the outside through its leading end and the extension pipe 10. At that time, an ejector effect produced at the leading end of the inner cylinder 6 permits the air within the outer cylinder 7 to be discharged out together with the exhaust gas through the extension pipe 10 thereby enabling the air within the engine compartment 3 to be discharged through the communicating holes 9 and the outer cylinder 7.

The isolating seal 17 serves to isolate the engine compartment 3 from the open air.

As mentioned in detail hereinabove, the present invention is characterized by comprising an inner cylinder 6 having a base portion connected to an exhaust pipe 8, an outer cylinder 7 surrounding the inner cylinder 6 in such a manner as to keep a predetermined clearance therebetween, the lower part of said outer cylinder 7 being inserted into an engine compartment 3 and having communicating holes 9 formed circumferentially therein, and an extension pipe 10 projecting upwardly above the leading end of the inner cylinder 6 and connected to the leading end of the outer cylinder 7, the arrangement being made such that an ejector portion is formed between the leading end of the outer cylinder 7 and that of the inner cylinder 6 and the approximately intermediate portion of the outer cylinder 7 is resiliently supported by the engine hood.

Accordingly, part of the muffler comprising the inner cylinder 6 and the outer cylinder 7 is located within the engine compartment 3 so that the level of noise generated by the side of the muffler can be suppressed or reduced.

Further, since part of the muffler is located within the engine compartment 3 and the muffler itself is supported at the position near the center of gravity thereof, an improved stability of the muffler can be obtained without rolling from side to side even if it is resiliently mounted through a cushion and so the cushion for mounting can be simplified in structure and becomes inexpensive.

Moreover, because communicating holes of a large size can be formed in the circumference of the outer cylinder 7, the air resistance can be reduced thereby enabling an efficient discharge of exhaust gas to be achieved.

Besides, since the part of the outer cylinder projecting out through the engine hood 12 is reduced as compared with that of the conventional muffler means, an excellent visibility can be obtained for the driver when driving the vehicle.

It is to be understood that the foregoing description is merely illustrative of a preferred embodiment of the invention, and that the scope of the invention is not to be limited thereto, but is to be determined by the scope of the appended claims.

What we claim is:

1. A muffler for a vehicle mounted on a hood of an engine compartment, comprising; an outer cylindrical member having a plurality of openings formed in the lower side wall thereof, said outer cylindrical member being formed in a conical shape at the upper side wall thereof and having a bottom wall in which a lower opening is formed, said outer cylindrical member comprising an upper cylindrical section and a lower cylindrical section each having a mounting flange fixedly secured to the lower end or upper end thereof, respectively; an inner cylindrical member mounted on the bottom wall of said outer cylindrical member, said inner cylindrical member being connected at the bottom thereof to an exhaust pipe and reduced in diameter at the upper side wall thereof; and mounting means for resiliently mounting said outer cylindrical member on said hood in such a manner that approximately lower half of said outer cylindrical member is positioned under said hood.

2. A muffler for a vehicle as set forth in claim 1 further comprising an extension pipe connected to the top end of said outer cylindrical member.

3. A muffler for a vehicle as set forth in claim 1 further comprising an annular sealing means disposed between the flange of said lower cylindrical section and said hood.

* * * * *